United States Patent
Iijima (12) 
(10) Patent No.: US 7,289,431 B2
(45) Date of Patent: Oct. 30, 2007

(54) PACKET TRANSMISSION METHOD (75) Inventor: Tomoyuki Iijima, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1003 days.

(21) Appl. No.: 10/197,413

(22) Filed: Jul. 18, 2002

(65) Prior Publication Data
US 2003/0043735 A1 Mar. 6, 2003

(30) Foreign Application Priority Data
Aug. 31, 2001 (JP) .............................. 2001-262657

(51) Int. Cl.
*G01R 31/08* (2006.01)
*H04L 12/28* (2006.01)
*H04L 12/56* (2006.01)

(52) U.S. Cl. .................................... 370/218; 370/392

(58) Field of Classification Search ........ 370/216–225, 370/389–395.1
See application file for complete search history.

(56) References Cited

U.S. PATENT DOCUMENTS

| 5,818,816 | A * | 10/1998 | Chikazawa et al. ......... 370/225 |
|---|---|---|---|
| 6,408,001 | B1 * | 6/2002 | Chuah et al. ............... 370/392 |
| 6,530,032 | B1 * | 3/2003 | Shew et al. ..................... 714/4 |
| 6,741,533 | B1 * | 5/2004 | Hiratsuka et al. ......... 369/44.41 |
| 6,859,842 | B1 * | 2/2005 | Nakamichi et al. ......... 709/238 |
| 6,895,441 | B1 * | 5/2005 | Shabtay et al. ............. 709/238 |
| 6,904,018 | B2 * | 6/2005 | Lee et al. .................... 370/238 |
| 6,925,054 | B1 * | 8/2005 | Atterton et al. ............. 370/218 |
| 6,944,156 | B2 * | 9/2005 | Suzuki ........................ 370/389 |
| 7,082,101 | B2 * | 7/2006 | Kim et al. ................... 370/225 |
| 2002/0172148 | A1 * | 11/2002 | Kim et al. ................... 370/216 |
| 2002/0191247 | A1 * | 12/2002 | Lu et al. ..................... 359/124 |

* cited by examiner

*Primary Examiner*—Chau Nguyen
*Assistant Examiner*—Marcus R Smith
(74) *Attorney, Agent, or Firm*—Reed Smith LLP; Stanley P. Fisher, Esq.; Juan Carlos A. Marquez, Esq.

(57) ABSTRACT

A packet transmission method is provided when there occurs a double fault in working paths of a 1:N configuration and when packets thereon are to be bypassed from the working paths to a recovery path, the packet can be transferred to the recovery path while retaining packet priority classes or VPNs on the recovery path. If faults occur in both a first line on which is set a first label-switched path and a second line on which is set a second label-switched path, packets which should flow respectively through the first and second label-switched paths are bypassed to the recovery path. At this time, different labels are affixed to the packets such that the thus-labeled packets are transferred to the recovery path.

18 Claims, 11 Drawing Sheets

| ADDRESS INFORMATION OF INPUT PACKET | NORMAL CONDITION | FAULTY CONDITION | |
|---|---|---|---|
| | OUTPUT LABEL | WORKING LABEL | RECOVERY LABEL |
| XXXXXX | $\alpha 1$ | $\alpha 2$ | $P1\alpha$ |
| YYYYYY | $\beta 1$ | $\beta 2$ | $P1\alpha$ |
| ZZZZZZ | $\gamma 1$ | $\gamma 3$ | $P1\beta$ |
| WWWWW | $\delta 1$ | $\delta 3$ | $P1\beta$ |

FIG. 2B

LSR60'S LABEL TABLE

| INPUT LABEL | OUTPUT LABEL |
|---|---|
| $P1\alpha$ | $P2\alpha$ |
| $P1\beta$ | $P2\beta$ |

FIG. 2C

LSR70'S LABEL TABLE

| INPUT LABEL | OUTPUT LABEL |
|---|---|
| $P2\alpha$ | $P3\alpha$ |
| $P2\beta$ | $P3\beta$ |

FIG. 3

(i) IN NORMAL CONDITION:

(ii) IN FAULTY CONDITION:

THE PARENTHESIZED NUMBER REPRESENTS THE NUMBER OF BITS.

| ADDRESS INFORMATION OF INPUT PACKET | NORMAL CONDITION | FAULTY CONDITION | |
|---|---|---|---|
| | OUTPUT LABEL | WORKING LABEL | RECOVERY LABEL |
| XXXXXX | α1 | α2 | P1 |
| YYYYYY | β1 | β2 | P1 |

FIG. 8B
PRIOR ART

| INPUT LABEL | OUTPUT LABEL |
|---|---|
| α1 | α2 |
| β1 | β2 |

FIG. 8C
PRIOR ART

| INPUT LABEL | OUTPUT LABEL |
|---|---|
| P1 | P2 |

LABEL α1 OR γ1 IS AFFIXED, IN ACCORDANCE WITH PACKET ADDRESS INFORMATION, TO A PACKET RECEIVED FROM NETWORK N1 AND THE PACKET WITH LABEL α1 AFFIXED THERETO IS TRANSMITTED TO A PATH LSPα, WHILE THE PACKET WITH LABEL γ1 AFFIXED THERETO IS TRANSMITTED TO A PATH LSPγ. LABEL β1 OR δ1 IS AFFIXED, IN ACCORDANCE WITH PACKET ADDRESS INFORMATION, TO A PACKET RECEIVED FROM NETWORK N2 AND THE PACKET WITH LABEL β1 AFFIXED THERETO IS TRANSMITTED TO A PATH LSPβ, WHILE THE PACKET WITH THE LABEL δ1 AFFIXED THERETO IS TRANSMITTED TO A PATH LSPδ.

FAULTS OCCUR IN BOTH A LINE ON WHICH THE PATHS LSPα AND β ARE SET AND A LINE ON WHICH THE PATHS LSPγ AND δ ARE SET

A RECOVERY LABEL P1α IS ADDED TO THE PACKETS WHICH SHOULD FLOW THROUGH THE PATHS LSPα AND LSPβ AND THE PACKETS WITH THE RECOVERY LABEL P1α ADDED THERETO ARE TRANSMITTED TO A RECOVERY PATH.
A RECOVERY LABEL P1β IS ADDED TO THE PACKETS WHICH SHOULD FLOW THROUGH THE PATHS LSPγ AND LSPδ AND THE PACKETS WITH THE RECOVERY LABEL P1β ADDED THERETO ARE TRANSMITTED TO THE RECOVERY PATH.

PACKET TRANSMISSION METHOD

FIELD OF THE INVENTION

The present invention relates to a method and system for the recovery of a network from any occurrence of faults, and particularly to a network recovery method and system suitable for Multi-Protocol Label Switching (MPLS).

BACKGROUND OF THE INVENTION

MPLS is a basic technique supporting the INTRANET and the Internet-Backbone, which technique is in the process of standardization by an MPLS working group of the Internet Engineering Task Force (IETF). MPLS uses a label switching technique having such characteristics as high-speed data transfer, scalability, and easy traffic control. In label switching, the forwarding of a label base and the routing of a network layer are combined, and the forwarding is performed with a label affixed to a packet.

In MPLS, a group of layer 3 packets, which are transmitted by the same method or handling (for example, transmitted on the same path and at the same service class), is defined as a forwarding equivalent class (FEC) and the same label is affixed to packet groups corresponding to FEC. As to a labeled packet, forwarding of layer 2 can be done by reference to only the label (determining parameters necessary for the layer 2 forwarding, such as path and service class for transmission by FEC corresponding to the label).

A label switching router as a packet relaying system implements label switching. It is important how a label is to be allocated in a packet.

In the Internet Protocol (IP) network which is popular today, connectability is important such that and only one service class (best effort type) has been provided. On the other hand, in MPLS, the transmission of data becomes flexible by combining label-base forwarding and network layer routing. This is very effective in improving Quality of Service (QoS), Traffic Engineering (TE), and Virtual Private Network (VPN).

However, in providing these services, a highly reliable and efficient data transmission becomes very important. The existing routing algorithm is strong and highly reliable but time-consuming (in the order of several seconds to several minutes) in recovery from a fault. To offer a highly reliable service, it is required that the recovery from a fault be done in several ten milliseconds like SONET. MPLS is expected to achieve a protection restoration effect which satisfies such a speed in a IP network.

In an MPLS network, the route is connection-oriented and can be handled as a path. Particularly, packet paths are classified as a working path and a recovery path before fault occurrence. All that is required in the event of fault occurrence is a mere switching from one to another path in accordance with predetermined working and recovery paths so as to avoid the fault promptly. At this time, recovery is effected using a technique called label stack. According to the label stack technique, after rewriting a label, one stage of label is added thereto, and a single packet is transmitted in a two-label multiplexed state. The packet transmission is made by reference to only the last-added label, whereby a virtual tunneling is implemented.

Figure 6:
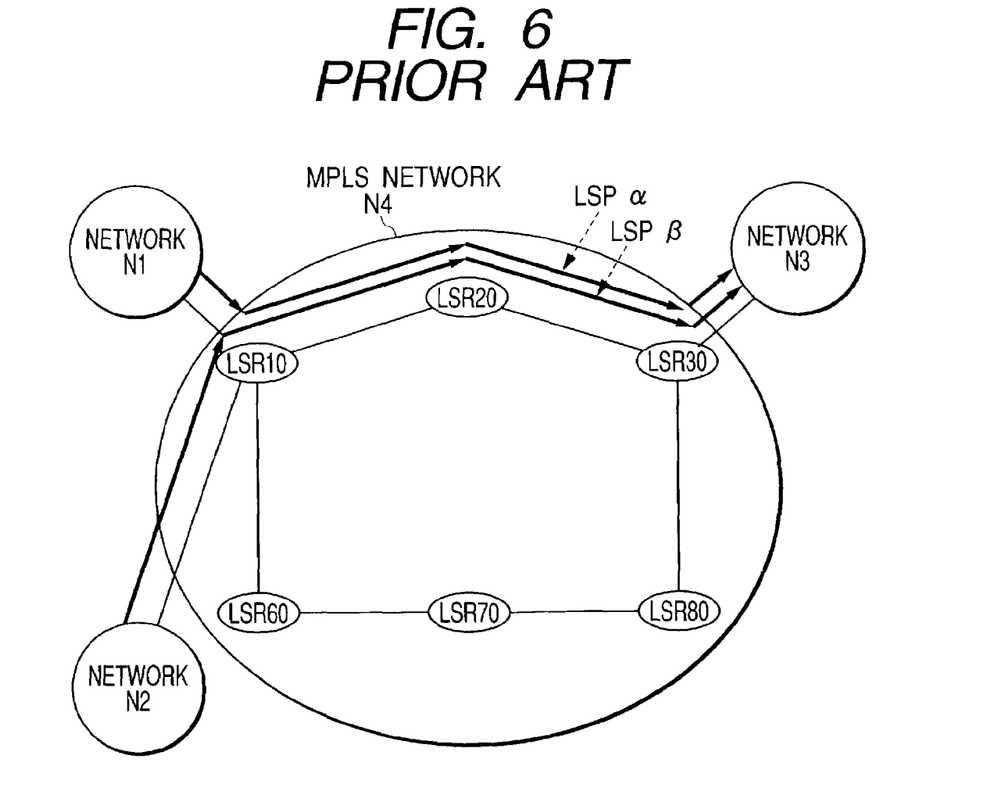
FIG. 6 is a diagram of an MPLS network which adapts a conventional 1:1 redundancy configuration.

Referring to FIG. 6, in case of data transfer from network N1 to network N3 and from network N2 to network N3, a recovery path (LSR10-LSR60-LSR70-LSR80-LSR30) is ensured and allocated beforehand for a working path (LSR10-LSR20-LSR30), in which LSR means a label switching router. Fine lines connecting between networks and between LSRs represent circuits. As these lines may be ATM lines and PPP over SONET (POS) lines. In case of using ATM lines, VPI/VCI serves as a label within the MPLS network. In case of using POS lines within the MPLS network, a Shim header is affixed to a packet and a label is set within the Shim header. These are the same in the other network diagrams according to the present application.

Figure 7:
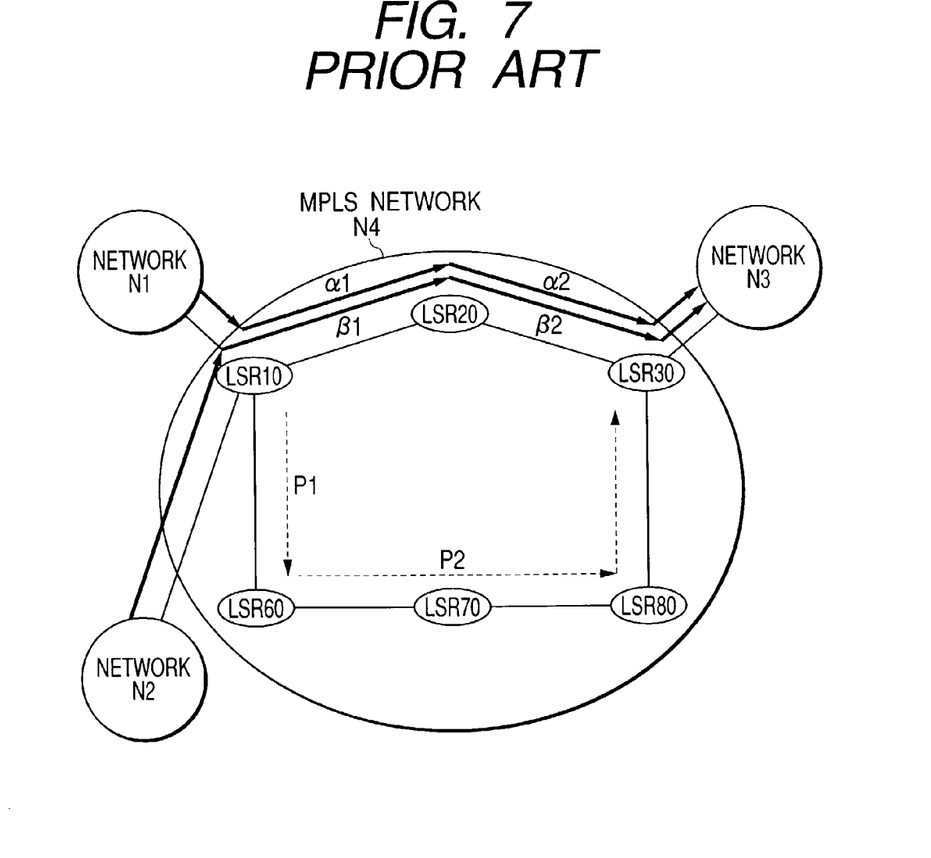
FIG. 7 is a diagram of a label setting example in the MPLS network adapting the conventional 1:1 redundancy configuration.
Figure 8A:
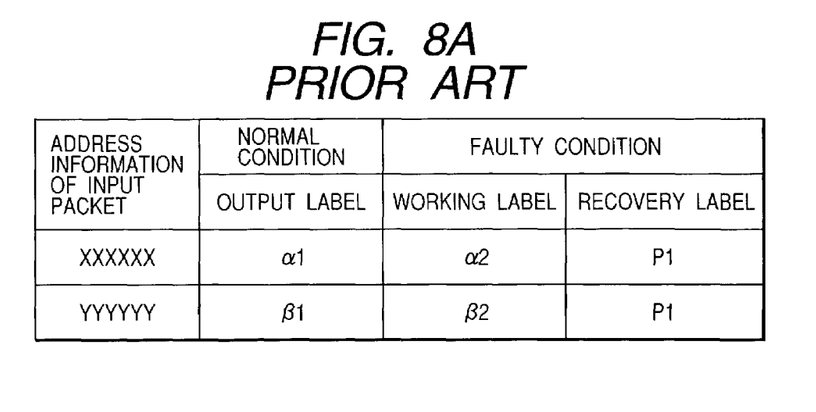
FIG. 8A is a diagram of a configuration example of tables held by a label switching router.
Figure 8B:
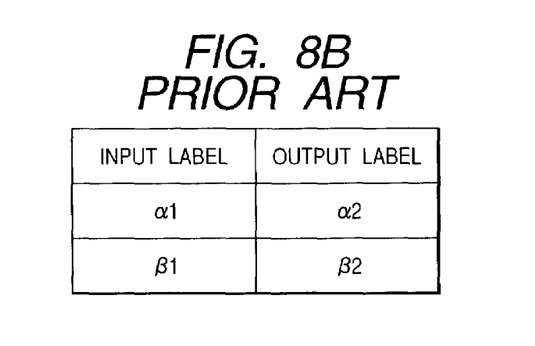
FIG. 8B is a diagram of a configuration example of tables held by a label switching router.

Now, with reference to FIGS. 7 and 8, the packet transmission in the network shown in FIG. 6 is described. LSR10, using a table (in normal condition) as shown in FIG. 8A, adds label $\alpha 1$ to a packet received from network A and adds label $\beta 1$ to a packet received from network B. For address information shown in FIG. 8A, IP address is used as an example. Although in FIGS. 6 and 7 LSR10 is shown as an edge node positioned at a boundary of the MPLS network, LSR10 may be a core node positioned at a core of the MPLS network. In this case, the packet inputted to LSR10 is already labeled such that label may be used. LSR10 can be an edge node or a core node. LSR 20, using a table as shown in FIG. 8B, rewrites the label of a packet received from Label Switched Path (LSP) $\alpha$ from $\alpha 1$ to $\alpha 2$ and the label of a packet received from path LSP $\beta$ from $\beta 1$ to $\beta 2$, then transmits them to LSR 30.

Figure 11:
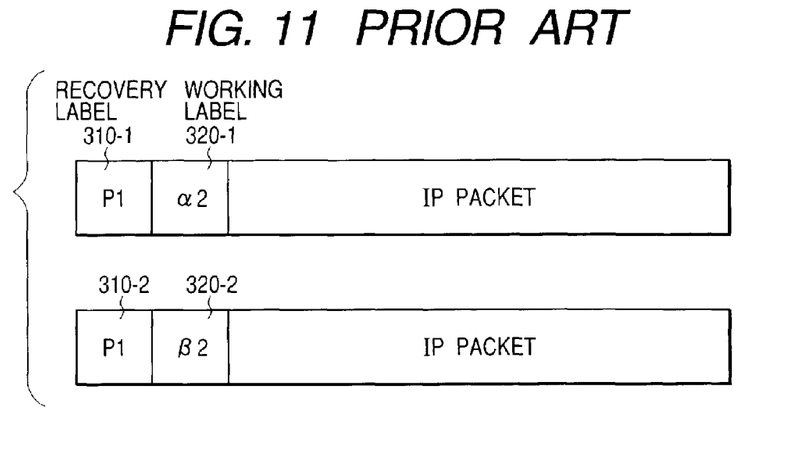
FIG. 11 shows formats of packets bypassed to a recovery path in the event of fault occurrence on a working path in the network shown in FIGS. 6 and 7.

For example, if a fault occurs between LSR20 and LSR30, LSR10 detects the fault and with the table (in faulty condition) in FIG. 8A, adds a label ("working label" hereinafter; $\alpha 2$ for LSP$\alpha$ between networks N1 and N3, $\beta 2$ for LSP$\beta$ between networks N2 and N3) which should be added upon arrival at LSR30, then adds thereto a label ("recovery label" hereinafter; P1) with a recovery path as an outgoing path, and transfers the packet in a label-stacked form. Such a packet format is shown in FIG. 11.

Figure 8C:
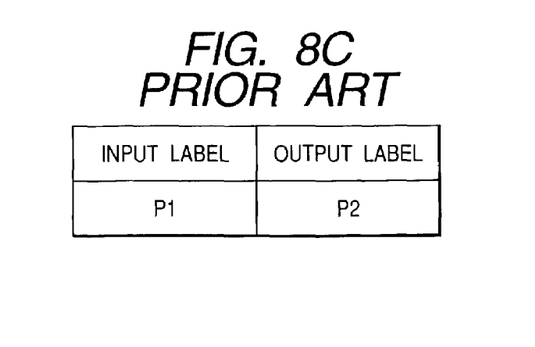
FIG. 8C is a diagram of a configuration example of tables held by a label switching router.

In a relay node on the path, the data which has been bypassed to the recovery path is determined for a packet destination with reference only to the recovery label, followed by rewriting of the recovery label affixed to the received packet into a recovery label corresponding to the destination such that the subsequent transmission of the packet has the thus-rewritten recovery label. For example, using the table shown in FIG. 8C, LSR60 rewrites the recovery label from P1 to P2 and transfers the packet with the thus-rewritten recovery label. At a node LSR80 located just before LSR30 a test of the penultimate hop popping (PHP) is performed, whereby a packet having the same label as in normal condition or even in faulty condition is sent. The PHP removes the recovery label at a node just before LSR30.

By implementing the above method, if LSR30 possesses only information for transmitting packets having labels $\alpha 2$ and $\beta 2$ to the network N3, it is possible to process the packets regardless of whether the working condition is normal or faulty. It is thus possible to decrease the amount of information to be held within the system.

Figure 9:
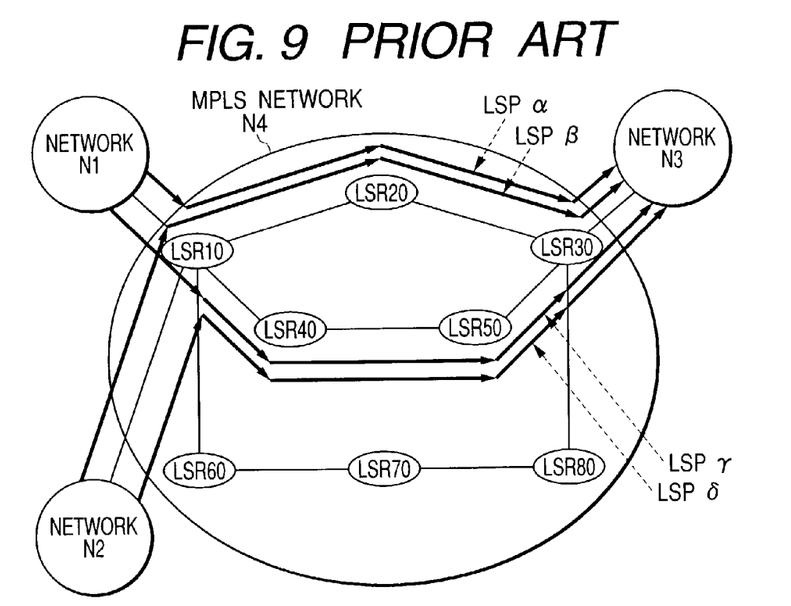
FIG. 9 is a diagram of an MPLS network which adapts a conventional 1:N redundancy configuration.

The above is a 1:1 configuration. FIG. 9 shows a recovery method expended from the 1:1 configuration to a 1:N configuration. The 1:1 configuration indicates a redundancy configuration wherein one recovery path is allocated for one working path, which provides a highly reliable network because a recovery path is ensured for each working path. On the other hand, the 1:N configuration indicates a redundancy configuration wherein one recovery path is shared by N number of working paths. Since plural working paths share a single recovery path, the cost is reduced as compared with the 1:1 redundancy configuration.

Figure 10:
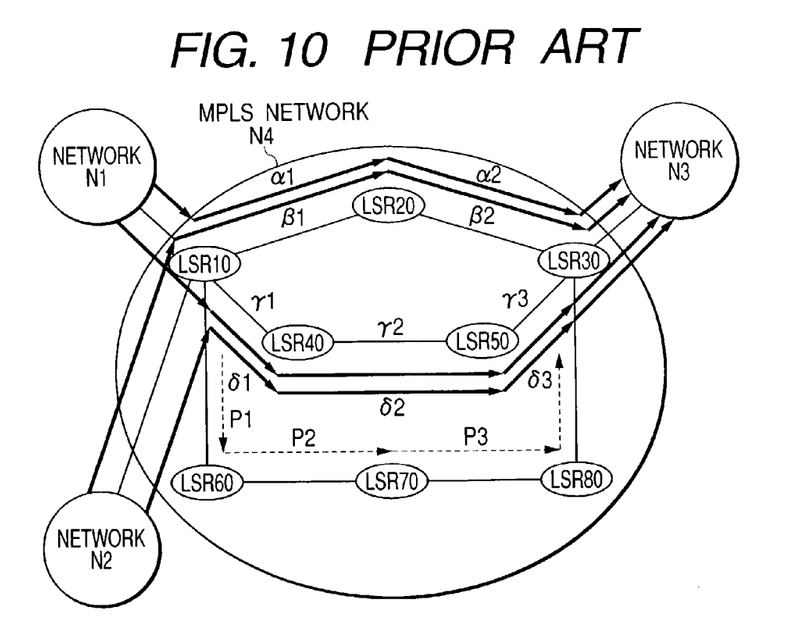
FIG. 10 is a diagram of a label setting example in the MPLS network adapting the conventional 1:N redundancy configuration.

In FIG. 9, traffic passing from network N1 to network N3 through LSR20, traffic passing from network N2 to network N3 through LSR20, traffic passing from network N1 to network N3 through LSR70, and traffic passing from network N2 to network N3 through LSR70, are assumed to be LSPα, LSPβ, LSPγ, and LSPδ, respectively. LSPα and LSPβ pass through a working path LSR10-LSR20-LSR30, while LSPγ and LSPδ pass through a working path LSR10-LSR40-LSR50-LSR30, and a single recovery path LSR10-LSR60-LSR70-LSR80-LSR30 is allocated beforehand for those plural working paths. At this time, as shown in FIG. 10, the labels of packets passing through LSPα, LSPβ, LSPγ, and LSPδ are rewritten like α1->α2, β1->β2, γ1>γ2->γ3, and δ1->δ2->δ3 at relay nodes on the working paths, and the packet with the thus-rewritten labels are transmitted. For LSR10 and the relay nodes on the working paths, the same tables in FIGS. 8A and 8B may be used, respectively.

Figure 12:
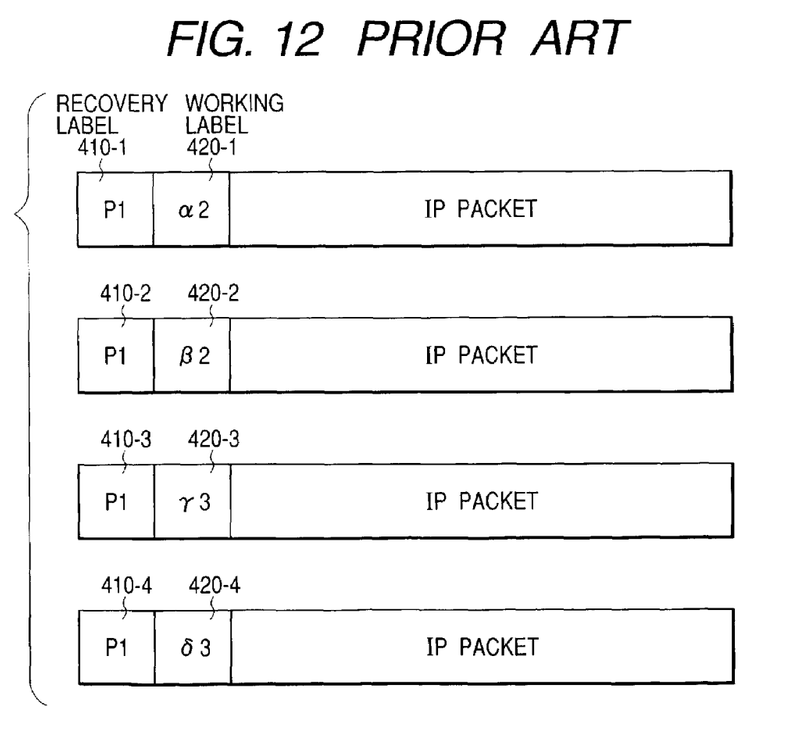
FIG. 12 shows formats of packets bypassed to a recovery path in the event of fault occurrence in working paths in the network shown in FIGS. 9 and 10.

For example, if a fault occurs between LSR20 and LSR30, LSR10 detects the fault and thereafter adds working labels (α2 for LSPα, β2 for LSPβ) which should be added upon arrival at LSR30. LSR10 further adds a recovery label (P1) with the recovery path as an outgoing path and transmits the thus-labeled packets in a label-stacked form. Likewise, in the event of occurrence of a fault between LRR50 and LSR30, LSR10 detects the fault and thereafter adds working labels (γ3 for LSPγ, δ3 for LSPδ) and further adds a recovery label (P1), then transmits the thus-labeled packets in a label stack form. These packet formats are as shown in FIG. 12. With respect to the data bypassed via the recovery path, as is the case with 1:1 configuration, only the upper recovery label is rewritten to P2 and P3 during transmission. Then, through PHP, the packets with the same labels as in normal condition or even in faulty condition arrive at LSR30. For the relay node on the recovery path, the same as that shown in the table of FIG. 8C may be used.

According to this method, if LSR30 possesses only information for transmitting the packets with labels α2, β2, γ3, and δ3 to the network N3, it can process the packets irrespective of whether the working condition is normal or faulty.

SUMMARY OF THE INVENTION

According to the conventional 1:N recovery method, when a fault in plural working paths is to be avoided by a single recovery path, the same specific or arbitrary recovery label is allocated. In the network of the configuration shown in FIG. 9, however, when traffics are distributed to different working paths priority classes or VPNs to offer different services, there arise the following problems.

The problems are described with reference to FIG. 10. For example, it is assumed that packets are being transmitted with labels α1, α2, β1, β2 at a high priority class on the working path LSR10-LSR20-LSR30 and with labels γ1, γ2, δ1, δ2 at a low priority class on the working path LSR10-LSR40-LSR50-LSR30. If faults should occur simultaneously between LSR20 and LSR30 as well as between LSR50 and LSR30, the traffics passing through those working paths are bypassed via the recovery path LSR10-LSR60-LSR70-LSR80-LSR30. In this case, if the same specific or arbitrary label P1 is affixed to the bypassed packets without distinguishing the original working paths, the traffics concerned are processed at the same service class on the recovery path such that the original priority classes of the working paths are ignored.

Consideration is given to the case where VPN1 is configured between networks N1 and N3 using LSPα, VPN2 is configured between networks N2 and N3 using LSPβ, VPN3 is configured between networks N1 and N3 using LSPγ, and VPN4 is configured between networks N2 and N3 using LSPδ, and packets flowing through VPN1 and VPN2 are given a higher priority than the priority given to packets flowing through VPN3 and VPN4. Also in this case there arises the same problem as above if faults occur in both working paths.

It is an object of the present invention to provide a recovery method which, upon occurrence of a fault, does not ignore an original priority class or VPN class determined for each working path while allowing traffics to bypass to a recovery path to avoid the fault.

According to one aspect of the present invention, when faults occur in a first line in which a first label switch path is set and also in a second line in which a second label switch path is set, packets which should flow through the first and second label switch paths are bypassed to a recovery path. At this time, different labels (including the original priority or VAN information) are affixed respectively to the packets which should flow through the first and second label switch paths, and then the thus-labeled packets are transferred to the recovery path.

Other aspects of the present invention will be made clear by way of embodiments of the present invention to be described below.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DETAILED DESCRIPTION OF THE PREFERRED EMBODIMENTS

Figure 1:
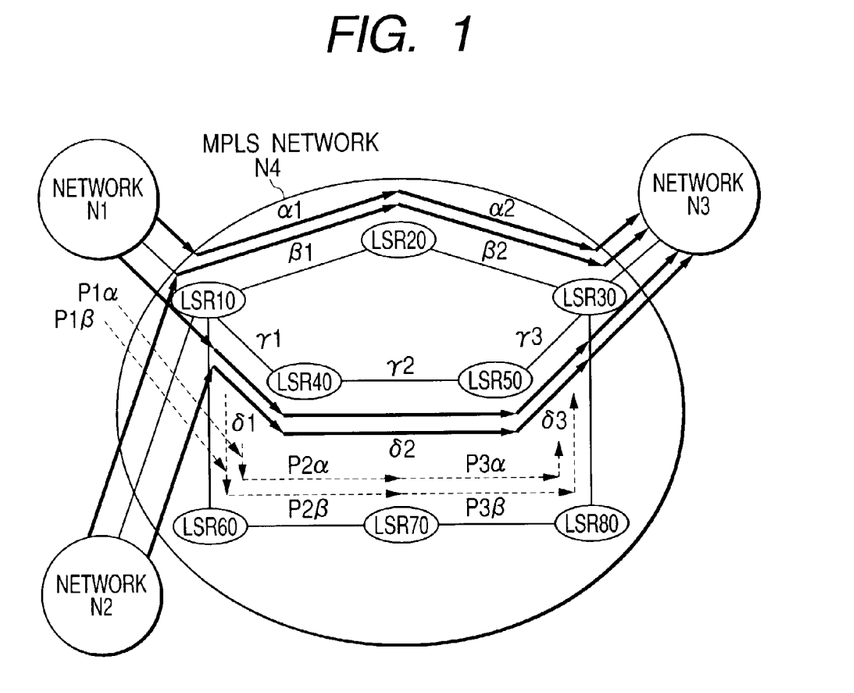
FIG. 1 is a diagram of an MPLS network which adapts a redundancy configuration of 1:N according to the present invention.

FIG. 1 illustrates an MPLS network which adapts a 1:N redundancy configuration according to the present invention. The traffic passing from network N1 to network N3 through LSR20, the traffic passing from network N2 to network N3 through LSR20, the traffic passing from network N1 to network N3 through LSR70, and the traffic passing from network N2 to network N3 through LSR70, are assumed to be LSP$\alpha$, LSP$\beta$, LSP$\gamma$, and LSP$\delta$, respectively. LSP$\alpha$ and LSP$\beta$ pass through a working path LSR10-LSR20-LSR30, while LSP$\gamma$ and LSP$\delta$ pass through a working path LSR10-LSR40-LSR50-LSR30. A single recovery path LSR10-LSR60-LSR70-LSR80-LSR30 is ensured and allocated beforehand for those plural working paths. LSP$\alpha$ and LSP$\beta$ are given a higher priority than LSP$\gamma$ and LSP$\delta$.

Figure 2A:
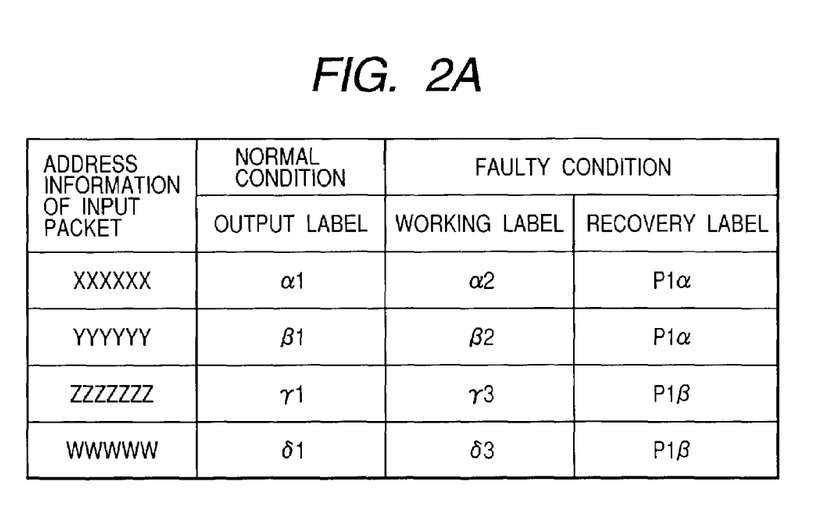
FIGS. 2A-2C show an example of tables held by a label switching router according to the present invention.

In a normal condition, the packets inputted to LSR10 are labeled $\alpha 1$, $\beta 1$, $\gamma 1$, $\delta 1$ in accordance with the table (in a normal condition) shown in FIG. 2A. In the same manner as shown in FIG. 9, LSP$\alpha$, LSP$\beta$, LSP$\gamma$, and LSP$\delta$ are transmitted through the working paths while being re-labeled $\alpha 1 \to \alpha 2$, $\beta 1 \to \beta 2$, $\gamma 1 \to \gamma 2 \to \gamma 3$, and $\delta 1 \to \delta 2 \to \delta 3$.

Figure 13:
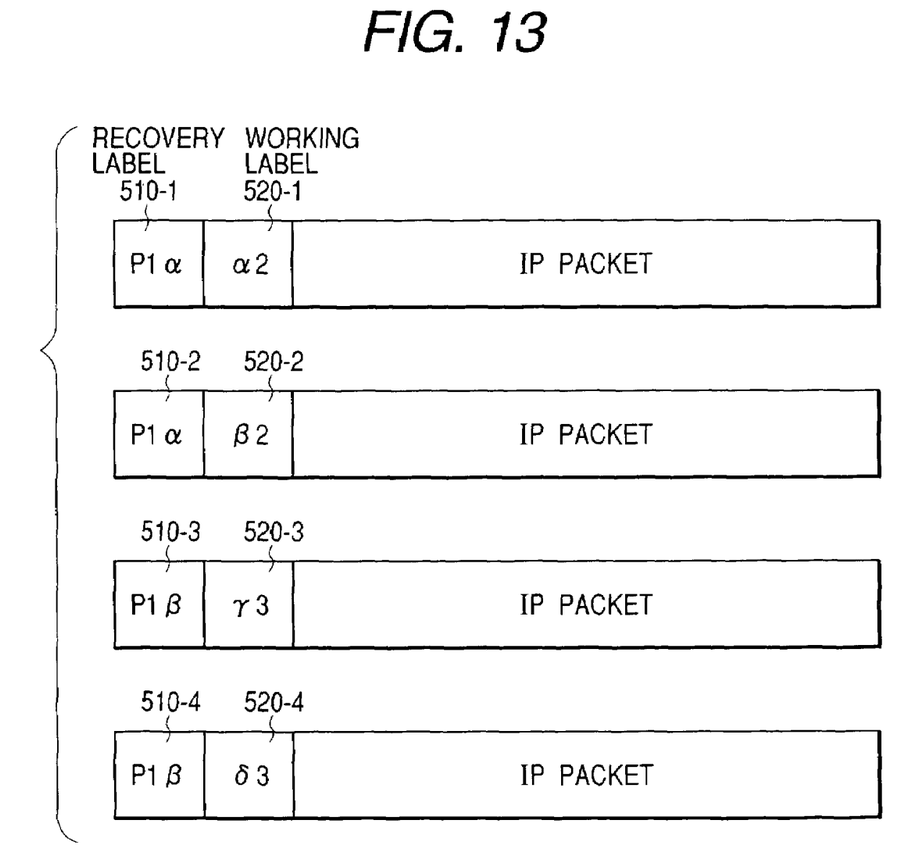
FIG. 13 shows formats of packets bypassed to a recovery path in the event of fault occurrence on working paths in the network shown in FIG. 1.

When a fault occurs on a working path and the data flowing on that path is to be bypassed via the recovery path in LSR10, a recovery label, which is determined uniquely for each working path, is added to the packet in LSR10. If a fault occurs in the working path LSR10-LSR20-LSR30, LSR10 detects the fault and thereafter adds to the packet a working label ($\alpha 2$ for LSP$\alpha$, $\beta 2$ for LSP$\beta$) which the packet should have at the time of arrival at LSR30. LSR10 further adds to the packet a recovery label (P1$\alpha$ for the working path LSR10-LSR20-LSR30) which is determined uniquely for each working path, with the recovery path as an outgoing path, and transmits the packet to the recovery path LSR10-LSR60-LSR70-LSR80-LSR30 in a label stacked form. Likewise, in the event of occurrence of a fault on the working path LSR10-LSR40-LSR50-LSR30, LSR10 detects the fault and thereafter adds a working label ($\gamma 3$ for LSP$\gamma$, $\delta 3$ for LSP$\delta$), then adds to the packet a recovery label (P1$\beta$ for the working path LSR10-LSR40-LSR50-LSR30) which is determined uniquely for each working path, with the recovery path as an outgoing path, and transmits the packet to the recovery path LSR10-LSR60-LSR70-LSR30 in a label stacked form. The packet formats concerned are shown in FIG. 13.

The packets which should flow through the working path LSR10-LSR20-LSR30 and the packets which should flow through the working path LSR10-LSR40-LSR50-LSR30 are given different space labels respectively. For example, LSR60 transmits the packets with recovery label P1$\alpha$ affixed thereto in preference to the packets with recovery label P1$\beta$ affixed thereto in terms of transmission priority.

Figure 2B:
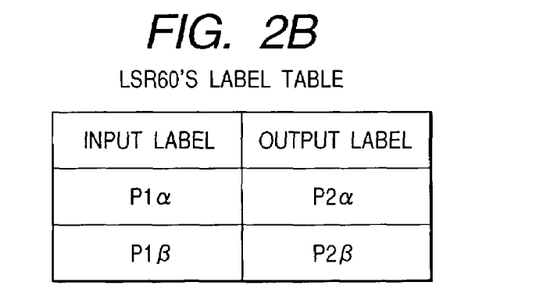
Figure 2C:
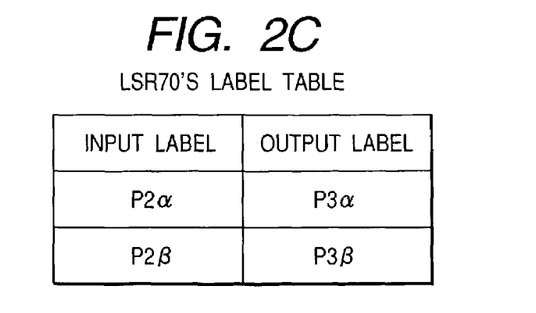

In LSR60, the packets transmitted from LSR60 are rewritten (only their recovery labels) P1$\alpha \to$P2$\alpha$ and P1$\beta \to$P2$\beta$ as shown in FIG. 2B. Also in LSR70, like LSR60, it is possible to effect a preferential transmission control for packets as shown in FIG. 2C.

The packets which have arrived at LSR80 are subjected to PHP processing and then reach LSR30.

When bypassing the packets from the faulty working path to the recovery path, a different recovery label is affixed to the packets which should flow through LSP$\gamma$ and LSP$\delta$ of a low priority. That is, since the packets which should flow through LSP$\alpha$ and LSP$\beta$ and the packets which should flow through LSP$\gamma$ and LSP$\delta$ belong to different service classes, it is possible to control such that the packets which should flow through LSP$\alpha$ and LSP$\beta$ are transmitted in preference to the packets which should flow through LSP$\gamma$ and LSP$\delta$ on the recovery path.

It is here assumed that VPN1 is configured between networks N1 and N3 using LSP$\alpha$, VPN2 is configured between networks N2 and N3 using LSP$\beta$, VPN3 is configured between networks N1 and N3 using LSP$\gamma$, and VPN4 is configured between networks N2 and N3 using LSP$\delta$. Also in this case, by affixing different recovery labels to the packets which should flow through VPN 1 and VPN 2 and the packets which should flow through VPN 3 and VPN 4, it becomes possible control such that the packets flowing through VPN 1 and VPN 2 are transmitted in preference to the packets which should flow through VPN 3 and VPN 4 on the recovery path.

According to this embodiment, the data transmission can be done while retaining different priority classes or VPNs for different working paths.

Figure 3:
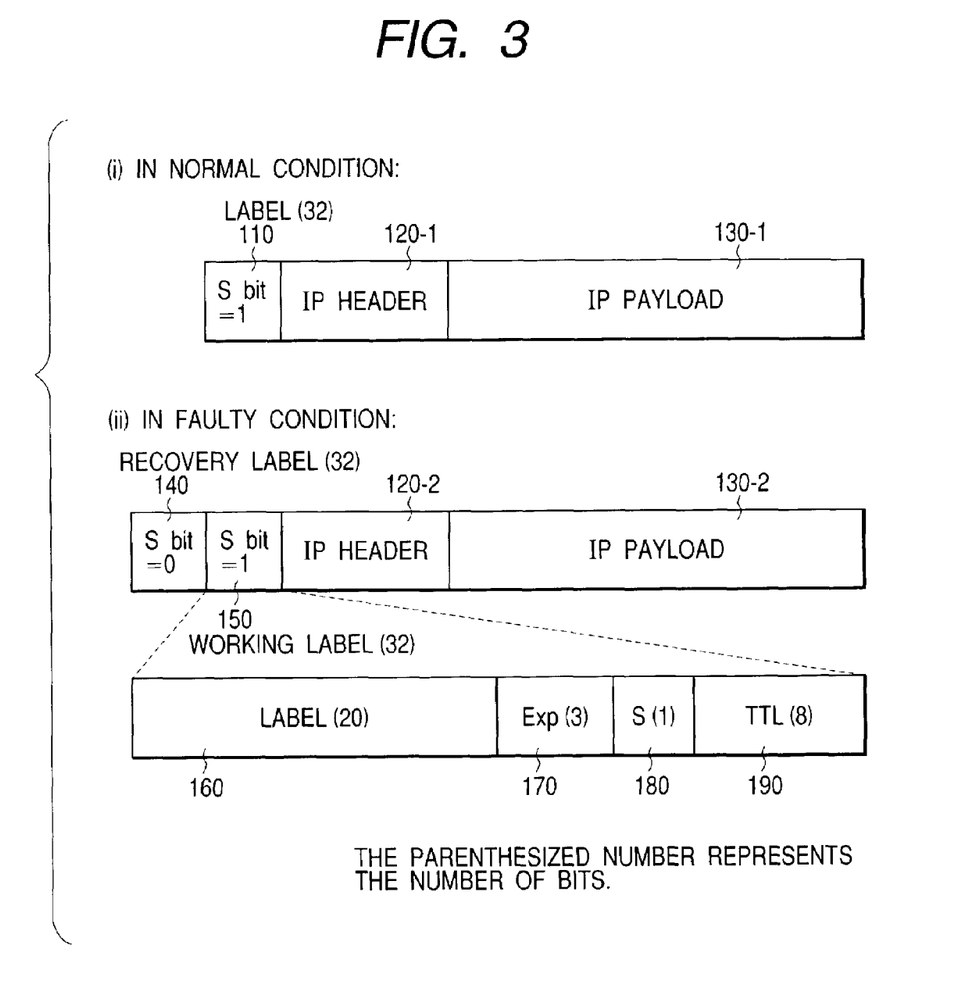
FIG. 3 is a packet format in a normal condition and a label-stacked packet format in a faulty condition according to the present invention.

FIG. 3 illustrates packet formats in label stack performed by LSR10. In a normal condition, only a 32-bit label is affixed to an IP packet which comprises an IP header and an IP payload, and the thus-labeled packet is transmitted. On the other hand, in a faulty condition, a 32-bit working label (a label to be present at the time of arrival at a destination) is affixed to the IP packet and a 32-bit recovery label (a label determined uniquely for each working path, with a recovery path as an outgoing path) is further added thereon, then the thus-labeled packet is transmitted.

The 32-bit label format comprises a 20-bit label portion, a 3-bit experimental (indicating a priority class) portion, a 1-bit stack (indicating whether a stack is present or not, with "0" indicating that there is a working label stacked behind and "1" indicating that there is no working label stacked behind) portion, and an 8-bit TTL portion. In a faulty condition, a packet is label-stacked and the stack portion of the working label indicates "0," while the stack portion of the recovery label indicates "1."

Figure 4:
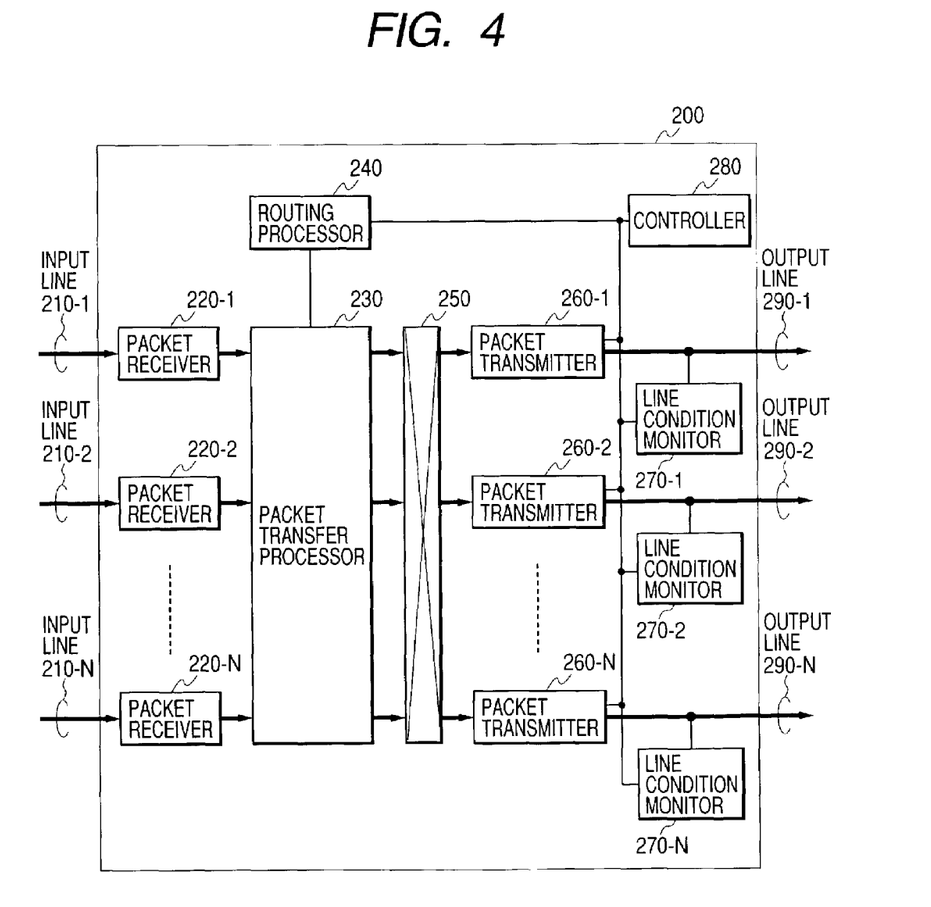
FIG. 4 is a block diagram of a configuration example of a label switching router according to the present invention.

FIG. 4 is a block diagram of a configuration example of each LSR of the MPLS network of FIG. 1. A router 200 is made up of N number of input lines 210-$i$ ($i$=1 to N) for inputting packets, packet receivers 220-$i$ for receiving packets, a packet transfer processor 230, a routing processor 240 for determining packet output lines, a switch 250, packet transmitters 260-$j$ for transmitting packets, line condition monitors 270-$j$ for monitoring the state of lines, N number of output lines 290-$j$ for outputting packets, and a controller 280 for controlling the router and for routing packets. The controller 280 sets tables within the routing processor and processes for the notification of a fault provided from each line condition monitor.

Upon the input of a packet from an input line 210-$i$ in the router 200, the respective packet receiver 220$i$ transmits the packet to the packet transfer processor 230. The packet transfer processor 230, upon receipt of the packet, extracts header information (including label) and transmits it to the routing processor 240. At this time, the packet is stored temporarily. The routing processor 240, which holds the table shown in FIG. 2A or FIG. 8, retrieves the table based on the received header information. As a result of the retrieval, an output label or a working label and a recovery label to be affixed to the packet are determined. And an output line for the output of the packet is also determined. The packet transfer processor 230 affixes the determined label to the packet and transmits the thus-labeled packet to the switch 250. The switch 250 switches the packet to the output line determined by the routing processor, whose packet reaches the corresponding packet transmitter 260-j. The packet transmitter 260-j performs a transmission control corresponding to the priority of the packet to transmit the packet to the corresponding output line 290-j.

Figure 5:
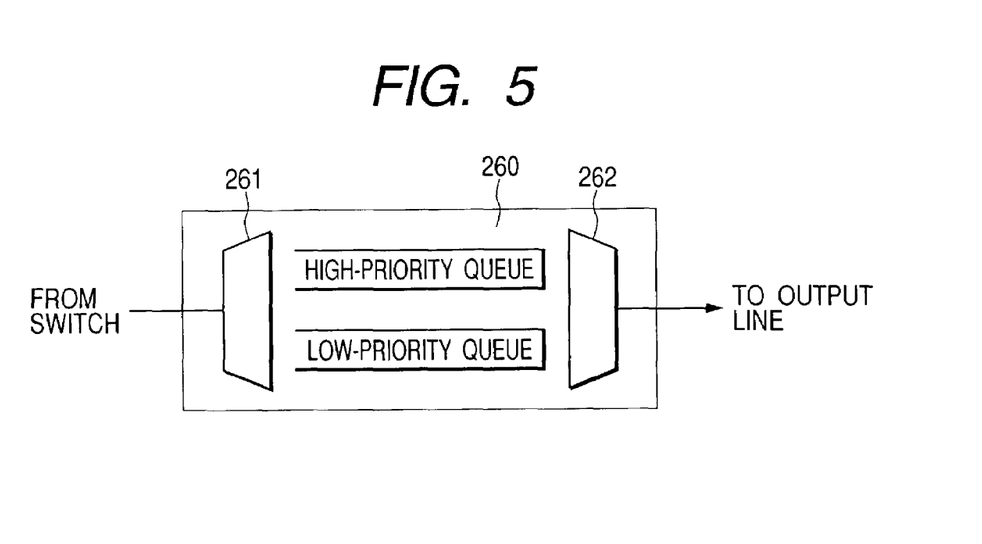
FIG. 5 is a diagram of a configuration example of a packet transmitter according to the present invention.

FIG. 5 shows a structural example of a packet transmitter. The packet transmitter includes a distributor circuit 261 for distributing received packets into a high-priority queue and a low-priority queue, and a packet read circuit 262 for reading queued packets from the high-priority queue in preference to the low-priority queue. For example, in LSR60, packets labeled P1α and P1β are distributed to the high-queue and the low-priority queue, respectively. Thus, a priority-based transmission control is performed for the packets.

Figure 14:
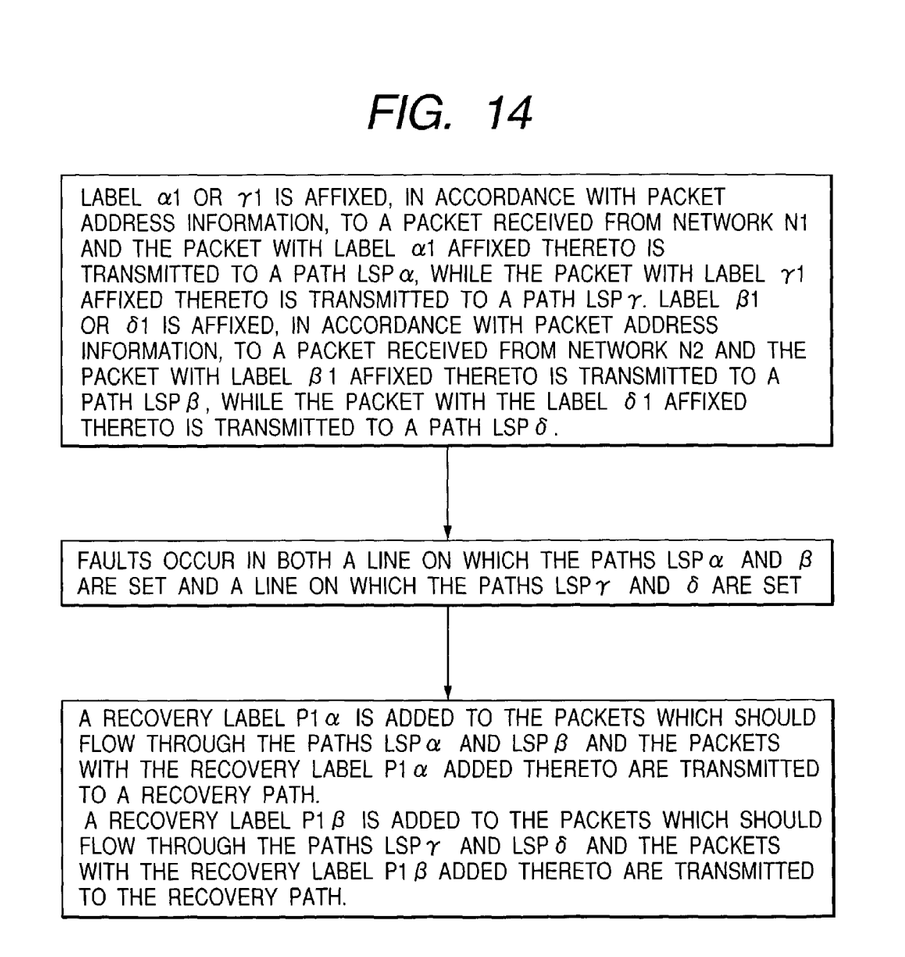
FIG. 14 shows an example of operation flow of a label switching router according to the present invention.

Lastly, a packet flow transmission performed by LSR10 in FIG. 1 is illustrated in FIG. 14 although it is apparent from the above description.

As set forth above, in the packet relaying system according to the present invention, double faults occur in working paths based on a 1:N redundancy configuration, and packets flowing thereon are bypassed from the working paths to a recovery path, it is possible to avoid the faults without ignoring the packets' priority classes or VPNs.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A packet transmission method implemented by a packet transmission system including at least a first label-switched path set on a first line, a second label-switched path set on a second line, and a first recovery path, the method comprising:

when there is no fault occurring in the first line and the second line, upon receipt of a first packet, affixing a first label to the first packet and transmitting the first packet with the first label affixed thereto to the first label-switched path; and upon receipt of a second packet, affixing a second label to the second packet and transmitting the second packet with the second label affixed thereto to the second label-switched path, while faults occur in the first line and the second line, upon receipt of the first packet, affixing a third label to the first packet and transmitting the first packet with the third label affixed thereto to the first recovery path; and upon receipt of the second packet, affixing a fourth label to the second packet and transmitting the second packet with the fourth label affixed thereto to the first recovery path, wherein at least one of (1) and (2) is true:

(1) the first packet is designated to be passed via the first label-switched path and the second packet is designated to be passed via the second label-switched path due to difference in priority levels, and each of the third label and the fourth label includes one respective priority level of the first packet and the second packet, (2) a first virtual private network (VPN) is set on the first line, and a second VPN is set on the second line, and the first packet is designated to be passed via the first line and the second packet is designated to be passed via the second line, wherein each of the third label and the fourth label includes a recovery label and a working label, the packet transmission system further includes a third label-switched path set on the first line, a fourth label-switched path set on the second line and lower in priority than the third label-switched path, and a second recovery path:

while faults occur in the first line and the second line, upon receipt of the first packet received from the first label-switched path, said packet communication system uses a new discovery label to replace the recovery label of the third label in a packet received from the first label-switched path to provide a fifth label before the first packet and transmits the first packet with the fifth label affixed thereto to the second recovery path, upon receipt of the second packet received from the second label-switched path, said packet communication system uses a new discovery label to replace the recovery label of the third label in a packet received from the second label-switched path to provide a sixth label before the second packet and transmits the packet with the sixth label affixed thereto to the second recovery path, and each of the fifth label and the six label includes said one respective priority level of the first packet and the second packet.

2. The packet transmission method according to claim 1, wherein:

while faults occur in the first line and the second line, upon receipt of the first packet, said packet communication system affixes the third label to the head of the first packet, and upon receipt of the second packet, said packet communication system affixes the fourth label to the head of the second packet.

3. The packet transmission method of claim 1, wherein the VPNs are controlled by different entities such that the first packet is designated to be passed via the first line and the second packet is designated to be passed via the second line.

4. The packet transmission method of claim 1, wherein each of the third label and the fourth label includes respective VPN information of the first packet and of the second packet.

5. The packet transmission method according to claim 1, wherein each of the first label and the second label has the same number of bits including a stack bit indicating whether there is any bit stacked behind.

6. The packet transmission method according to claim 5, wherein the same bit number is 32.

7. The packet transmission method according to claim 1, wherein each of the third label and the fourth label includes a recovery label and a working label, each of the recovery label and the working label has the same number of bits including a stack bit indicating whether there is any bit stacked behind.

8. The packet transmission method according to claim 7, wherein the same bit number is 32.

9. The packet transmission method according to claim 7, wherein at least one binary code in each recovery label of the third label and the fourth label is converted back to at least one of a respective priority level and a VPN of the first packet and of the second packet according to a conversion table.

10. A packet transmission system comprising:
a first label-switched path set on a first line;
a second label-switched path set on a second line;
a third label-switched path set on the first line;
a first recovery path;
a fourth label-switched path set on the second line and lower in priority than the third label-switched path, and a second recovery path; and
label affixing means for affixing at least one label to a received packet,
when there is no fault occurring in the first line and the second line,
upon receipt of a first packet, said label affixing means affix a first label to the first packet such that the system transmits the first packet with the first label affixed thereto to the first label-switched path; and
upon receipt of a second packet, said label affixing means affix a second label to the second packet such that the system transmits the second packet with the second label affixed thereto to the second label-switched path,
while faults occur in the first line and the second line,
upon receipt of the first packet, said label affixing means affix a third label to the first packet such that the system transmits the first packet with the third label affixed thereto to the first recovery path; and
upon receipt of the second packet, said label affixing means affix a fourth label to the second packet such that the system transmits the second packet with the fourth label affixed thereto to the first recovery path,
wherein at least one of (1) and (2) is true:
(1) the first packet is designated to be passed via the first label-switched path and the second packet is designated to be passed via the second label-switched path due to difference in priority levels, and each of the third label and the fourth label includes one respective priority level of the first packet and the second packet,
(2) a first virtual private network (VPN) is set on the first line, and a second VPN is set on the second line, and the first packet is designated to be passed via the first line and the second packet is designated to be passed via the second line,
wherein while faults occur in the first line and the second line,
each of the third label and the fourth label includes a recovery label and a working label,
upon receipt of the first packet received from the first label-switched path, said packet communication system uses a new discovery label to replace the recovery label of the third label in a packet received from the first label-switched path to provide a fifth label before the first packet and transmits the first packet with the fifth label affixed thereto to the second recovery path,
upon receipt of the second packet received from the second label-switched path, said racket communication system uses a new discovery label to replace the recovery label of the third label in a packet received from the second label-switched path to provide a sixth label before the second packet and transmits the packet with the sixth label affixed thereto to the second recovery path, and
each of the fifth label and the six label includes said one respective priority level of the first packet and the second packet.

11. The packet transmission system according to claim 10, wherein:
while faults occur in the first line and the second line,
upon receipt of the first packet, said label affixing means affix the third label to the head of the first packet, and
upon receipt of the second packet, said label affixing means affix the fourth label to the head of the second packet.

12. The packet transmission system of claim 10, wherein the VPNs are controlled by different entities such that the first packet is designated to be passed via the first line and the second packet is designated to be passed via the second line.

13. The packet transmission method of claim 10, wherein each of the third label and the fourth label includes respective VPN information of the first packet and of the second packet.

14. The packet transmission method according to claim 10, wherein each of the first label and the second label has the same number of bits including a stack bit indicating whether there is any bit stacked behind.

15. The packet transmission method according to claim 14, wherein the same bit number is 32.

16. The packet transmission method according to claim 10, wherein each of the third label and the fourth label includes a recovery label and a working label, each of the recovery label and the working label has the same number of bits including a stack bit indicating whether there is any bit stacked behind.

17. The packet transmission method according to claim 16, wherein the same bit number is 32.

18. The packet transmission method according to claim 16, wherein at least one binary code in each recovery label of the third label and the fourth label is converted back to at least one of a respective priority level and a VPN of the first packet and of the second packet according to a conversion table.

* * * * *